United States Patent
Patsouris

(10) Patent No.: US 9,476,362 B2
(45) Date of Patent: Oct. 25, 2016

(54) TURBOMACHINE WITH BLEED VALVES LOCATED AT THE INTERMEDIATE CASE

(75) Inventor: Emmanuel Patsouris, Melun (FR)

(73) Assignee: SNECMA, Paris (FR)

(*) Notice: Subject to any disclaimer, the term of this patent is extended or adjusted under 35 U.S.C. 154(b) by 378 days.

(21) Appl. No.: 14/122,810

(22) PCT Filed: May 30, 2012

(86) PCT No.: PCT/FR2012/051213
§ 371 (c)(1),
(2), (4) Date: Nov. 27, 2013

(87) PCT Pub. No.: WO2012/164224
PCT Pub. Date: Dec. 6, 2012

(65) Prior Publication Data
US 2014/0075956 A1 Mar. 20, 2014

(30) Foreign Application Priority Data

May 31, 2011 (FR) .................................. 11 54745

(51) Int. Cl.
*F02C 6/08* (2006.01)
*F02C 9/18* (2006.01)
*F01D 9/06* (2006.01)
(Continued)

(52) U.S. Cl.
CPC ................ *F02C 9/18* (2013.01); *F01D 9/065* (2013.01); *F01D 17/105* (2013.01); *F01D 17/162* (2013.01); *F02C 6/08* (2013.01); *F02K 3/02* (2013.01); *F02K 3/075* (2013.01); *F04D 27/023* (2013.01); *F04D 27/0215* (2013.01); *F04D29/545* (2013.01); *F05D 2270/101* (2013.01); *Y02T 50/671* (2013.01)

(58) Field of Classification Search
CPC ........ F04D 27/0215; F02C 6/08; F02C 9/18; F02C 7/052; F02K 3/075
See application file for complete search history.

(56) References Cited

U.S. PATENT DOCUMENTS 3,638,428 A   2/1972   Shipley et al.
3,861,822 A   1/1975   Wanger
(Continued)

FOREIGN PATENT DOCUMENTS

EP   0 902 179   3/1999
EP   2 034 134   3/2009
(Continued)

OTHER PUBLICATIONS

International Search Report Issued Oct. 11, 2012 in PCT/FR12/051213 Filed May 30, 2012.

*Primary Examiner* — Andrew Nguyen
(74) *Attorney, Agent, or Firm* — Oblon, McClelland, Maier & Neustadt, L.L.P.

(57) ABSTRACT

An assembly including an intermediate case of a bypass turbojet engine and of an inter-jet case extending upstream of the intermediate case to separate a primary air jet of the turbojet engine from its bypass air jet, the inter-jet case including, passing through it, a closable duct for diverting part of the primary flow to the bypass flow thereby forming a blow-off valve for the LP compressor, the intermediate case including arms passing across the bypass flow and the inter-jet case in its internal cavity including a first chamber situated upstream of the arms and a second chamber situated level with the arms, the duct being open or closed off by an annular component capable of axial movement set in motion by an arm that can rotate about a fixed pivot under action of a control cylinder, the cylinder being positioned in the second chamber.

9 Claims, 4 Drawing Sheets

(51) Int. Cl.
  *F01D 17/10* (2006.01)
  *F01D 17/16* (2006.01)
  *F02K 3/02* (2006.01)
  *F02K 3/075* (2006.01)
  *F04D 29/54* (2006.01)
  *F04D 27/02* (2006.01)

(56) References Cited

U.S. PATENT DOCUMENTS

| | | | |
|---|---|---|---|
| 4,827,713 A | * | 5/1989 | Peterson .............. F01D 17/105 415/150 |
| 5,048,286 A | | 9/1991 | Stransky et al. |
| 6,048,171 A | | 4/2000 | Donnelly et al. |
| 2008/0063515 A1 | * | 3/2008 | Bil ...................... F01D 17/105 415/145 |
| 2009/0056307 A1 | | 3/2009 | Mons |
| 2009/0229244 A1 | | 9/2009 | Brogren |
| 2010/0189549 A1 | | 7/2010 | Gilman et al. |

FOREIGN PATENT DOCUMENTS

| | | | | |
|---|---|---|---|---|
| EP | 2 211 026 | | 7/2010 | |
| FR | 2 088 303 | | 1/1972 | |
| FR | 2926328 | * | 7/2009 | ............... F02C 7/05 |
| WO | 2007 129937 | | 11/2007 | |

* cited by examiner ured on bearings which are situated at the front and rear of the engine 35 intermediate case to separate the primary and bypass flows
TURBOMACHINE WITH BLEED VALVES LOCATED AT THE INTERMEDIATE CASE

BACKGROUND OF THE INVENTION

1. Field of the Invention

The area of the invention is that of turbomachines, and more particularly that of devices allowing air to be discharged at the outlet from a compressor when necessary according to the conditions of use of the turbomachine.

2. Description of the Related Art

Commercial aircraft are generally fitted with bypass turboduct engines which consist of a gas turbine driving a ducted fan which is generally situated upstream of the engine. The mass of air drawn in by the engine is divided into a primary flow, which circulates in the gas turbine or primary body, and a bypass flow which is created by the fan, the two flows being concentric. The primary flow or hot flow leaves the fan to pass into the primary body where it is recompressed, heated in a combustion chamber, guided towards successive stages of turbines and then ejected in a primary gas flow. The bypass flow or cold flow is compressed by the ducted fan stage then ejected directly without having been heated. The two flows can be ejected separately in two concentric flows, or mixed into the same channel before ejection. They separate downstream of the fan at an inter-duct case which surrounds the primary flow and, via its outer part, guides the bypass flow into a cold flow channel.

The primary flow is generally compressed by a first compressor, known as the low pressure (LP) or booster compressor, which is driven by the same LP shaft as the fan, and then guided into a second, high pressure (HP) compressor driven by an HP shaft, before entering the combustion chamber. The two LP and HP shafts are supported on bearings which are situated at the front and rear of the engine and are themselves supported by structural components, known as the intermediate case at the front and as the exhaust case at the rear. With regard to the front part which is shown generically in FIG. 1, the intermediate case is linked to the external structure of the engine by arms which pass through the bypass flow in order to transmit the weight and thrust forces thereon to the aircraft. Conventionally, the arms of the intermediate case are situated axially between the LP compressor and the HP compressor, delimiting three chambers in the inter-duct case: a first chamber, called the fan booster inter-duct case, is situated upstream of said arms and surrounds the LP compressor to separate the primary flow passing into the LP compressor from the bypass flow circulating in the cold flow channel; a second chamber, called the intermediate inter-duct case, guides the primary and bypass flows between the different arms of the intermediate case; finally a third chamber, called the core compartment, surrounds the HP compressor and extends along the engine downstream of the intermediate case arms.

Also, existing engines are generally fitted with devices known as bleed valves or VBV (variable bleed valve) which allow part of the primary flow leaving the LP compressor to return to the cold flow channel, where it mixes with the bypass flow. The effect of this discharge is to lower the operating point of the LP compressor by lowering the pressure downstream, and avoid surge phenomena. The discharge is achieved through openings made in the upper wall of the primary duct between the LP and HP compressors, and by the passage of air taken from a duct which brings it level with an outlet grille situated on the inner wall of the bypass duct, downstream of the diffusers placed in the bypass flow (OGV). The openings can be doors which open like a scoop, by rotating around an axis oriented tangentially to one of the walls of the inter-duct case, or more recently a slot or grille which extends circumferentially and is closed by a so-called guillotine ring moving axially. In both cases, the openings are controlled using arm, pivot or cylinder type mechanisms arranged inside the chambers of the inter-duct case. In the case of door systems, these can be synchronized by a circumferential ring which actuates their opening or closing arms simultaneously. Whatever type of opening is selected, the various actuator elements are generally divided between the three chambers of the inter-duct case, depending on the space available in each.

However, the space available—in particular in the first chamber—is extremely limited and it is very difficult to accommodate part of the mechanism there without deforming the profile of the inter-duct case, which would have an effect on the aerodynamic flow of the primary and bypass ducts. Similarly, the cylinders which actuate this mechanism are relatively bulky and must generally be placed in the third chamber, which may already contain a substantial amount of equipment.

In this case, the proximity of these cylinders to the HP compressor means that cylinders with a cooling system must be used, which increases their volume further.

It is therefore desirable to design control devices for the LP compressor bleed valves which are relatively compact and can substantially be accommodated in the first or second cavity of the inter-duct case.

BRIEF SUMMARY OF THE INVENTION

To this end, the subject of the invention is an assembly comprising an intermediate case of a bypass turboduct engine and an inter-duct case extending upstream of said intermediate case to separate the primary and bypass flows of the turboduct engine, said inter-duct case having, passing through it, a closable duct for diverting part of the primary flow to the bypass flow, thereby forming a bleed valve for the LP compressor, said intermediate case comprising arms passing through the bypass flow, and said inter-duct case comprising in its inner cavity a first chamber situated upstream of said arms and a second chamber situated level with said arms, said duct being opened or closed by an annular component capable of axial movement set in motion by an arm which is itself set in motion about a fixed pivot on the intermediate case by a control cylinder, characterized in that said cylinder is positioned in the second chamber.

The arrangement of the bleed valve control cylinder in the second chamber means it is outside the fire zone and need not be subject to severe standards of fire resistance. Therefore it requires no cooling system, and can be smaller and lighter.

Advantageously the cylinder is oriented in the circumferential direction of the intermediate case. This orientation facilitates its installation in the second chamber.

Preferably the cylinder is mounted in a manner freely rotatable about an axis oriented radially, in a plane tangential to said intermediate case. In fact, the end of the cylinder rod must be able to describe a circular trajectory in order to drive the articulated arm.

In a particular embodiment, the rod of the cylinder is directly connected to the control arm of said annular component. By mounting in this way, no intermediate connecting rod is required between the cylinder and the articulated arm, limiting the mass and space required for the system.

Preferably the pivot is also positioned in the second chamber. The number of elements positioned in the first chamber is then minimal, which allows the use of this type of bleed valve on small engines.

The invention also concerns a bypass turboduct engine comprising a bleed valve for its LP compressor which functions by diversion of part of the flow circulating in its primary duct to its bypass duct, via a duct which can be closed via an annular component capable of axial movement, characterized in that it comprises an assembly comprising an intermediate case and an inter-duct case as described above.

BRIEF DESCRIPTION OF THE SEVERAL VIEWS OF THE DRAWINGS

The invention will be better understood, and other aims, details, characteristics and advantages thereof will appear more clearly from the detailed explanatory description below of an embodiment of the invention, given purely illustratively as an example and not limitatively, with reference to the attached schematic drawings.

In these drawings.

DETAILED DESCRIPTION OF THE INVENTION

In the description which follows, the terms "upstream" and "downstream" should be interpreted according to the direction of flow of fluid passing through the engine, while the terms "internal" and "external" relate to the distance of the element concerned from the rotation axis of the engine. The terms "axial" and "radial" relate to the axis of rotation of the engine.

Figure 1:
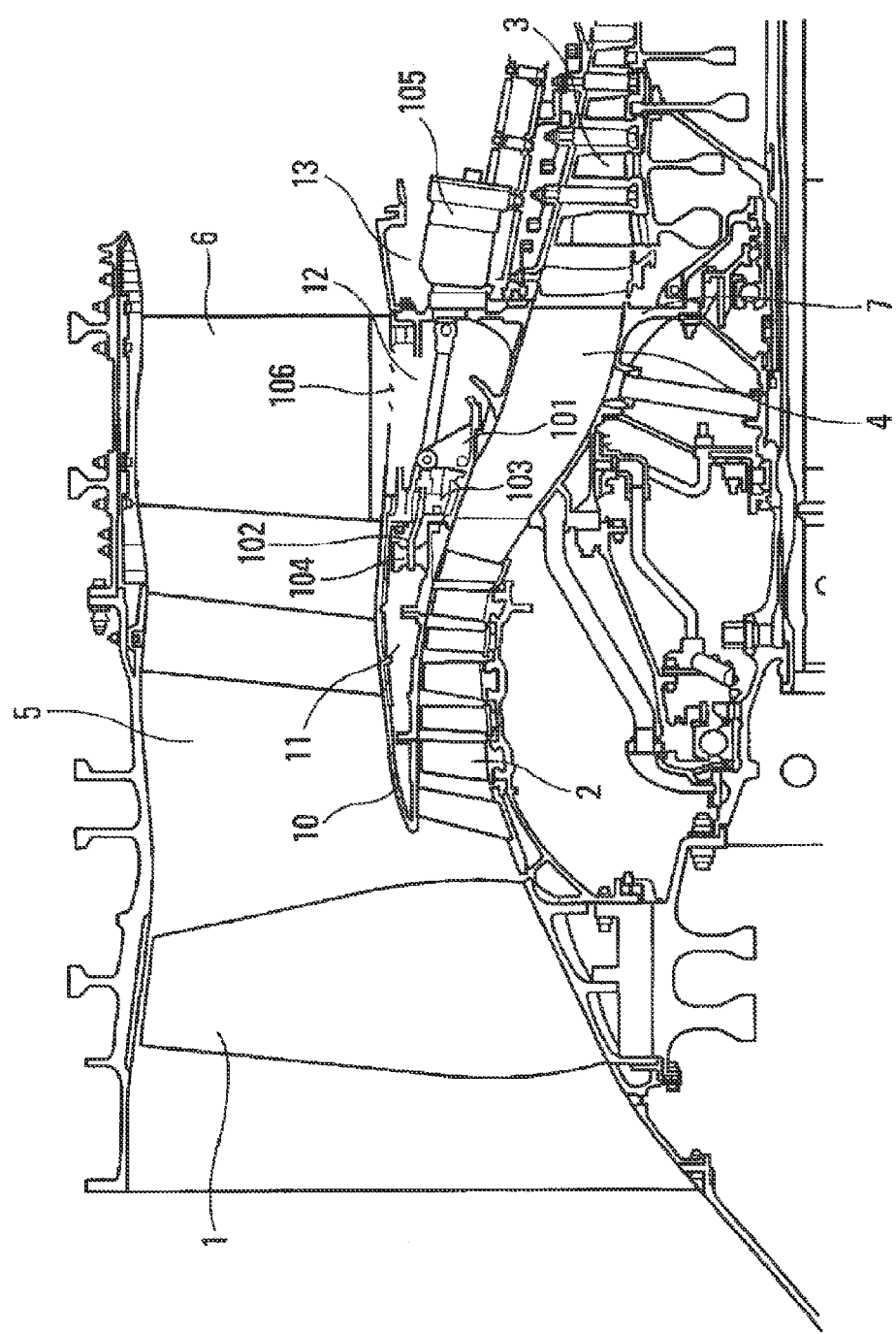
FIG. 1 is a general cross section view of the upstream part of a bypass turboduct engine.

FIG. 1 shows the upstream part of a bypass turboduct engine with a high dilution rate, comprising a fan blade 1 which compresses the air entering the air inlet sleeve of the engine, before the air is divided into the primary flow which circulates in a primary duct 4—passing first through the LP compressor 2 and then the HP compressor 3—and the bypass flow which circulates in a bypass duct 5 to be ejected directly at the nozzle. Passing through the bypass duct are the arms 6 of the intermediate case 7, which connect the upstream structural part of the engine to the elements on the aircraft receiving the forces generated by the engine. These arms 6 take the form of winglets oriented in the bed of the bypass flow in order to minimize their aerodynamic resistance.

The air which circulates in the primary duct 4 passes through the LP compressor 2 for a first compression, then the intermediate case at the level of the arms 6, and undergoes a second compression by the HP compressor 3.

The primary and bypass flows are separated at the outlet from the fan wheel 1 by an inter-duct case 10 which has an edge upstream and thickens in the downstream direction to form a cavity, in which a system is positioned for discharging to the bypass duct 5 the flow circulating in the primary duct 4 downstream of the LP compressor 2. The inner cavity of the inter-duct case 10 consists of three chambers in succession from upstream to downstream, namely a first chamber 11 situated upstream of the arms 6 of the intermediate case 7, a second chamber 12 corresponding to the wingspan of the arms 6, and a third chamber 13 situated downstream of the arms 6. This third chamber contains in particular the control devices for adjusting the diffusers of the HP compressor 3. FIG. 1 shows a system according to the prior art based on opening doors 101, which are moved by connecting rods 102 turning around a radial pivot 103 and actuated by the circumferential rotation of a control ring 104. The connecting rods and the control ring are actuated by one or several cylinders 105 situated in the third chamber 13. The discharged air passes into the second cavity 12 through doors 101 and leaves it through a set of slots 106 which connect this second cavity with the bypass duct 5.

Figure 2:
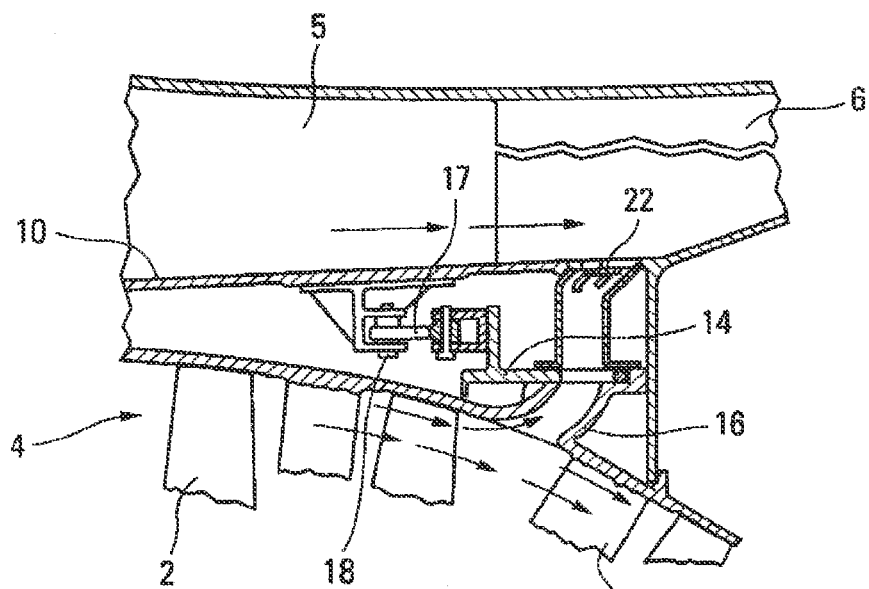
FIG. 2 is a cross section view of a guillotine-type discharge system of the LP compressor of a turboduct engine.

FIG. 2 shows a bleed valve comprising a guillotine-type closure device. The primary duct 4 has a diversion which is positioned downstream of the LP compressor 2 and upstream of the inlet diffuser of the HP compressor 3, and which penetrates into the inner cavity at the inter-duct case 10 via a duct 16 oriented in the direction of the bypass flow 5. The duct opens into the bypass duct 5 through an evacuation grille 22. In the path of this duct 16 is a ring 14 which is capable of moving axially to open or close the duct 16, and allow a greater or lesser amount of air to escape from the primary flow. The movement of the ring 14 is obtained by the actuation of an arm 17 attached at one of its ends to a cap which is carried by the ring and moved in rotation around a pivot 18, by means not shown.

Figure 3:
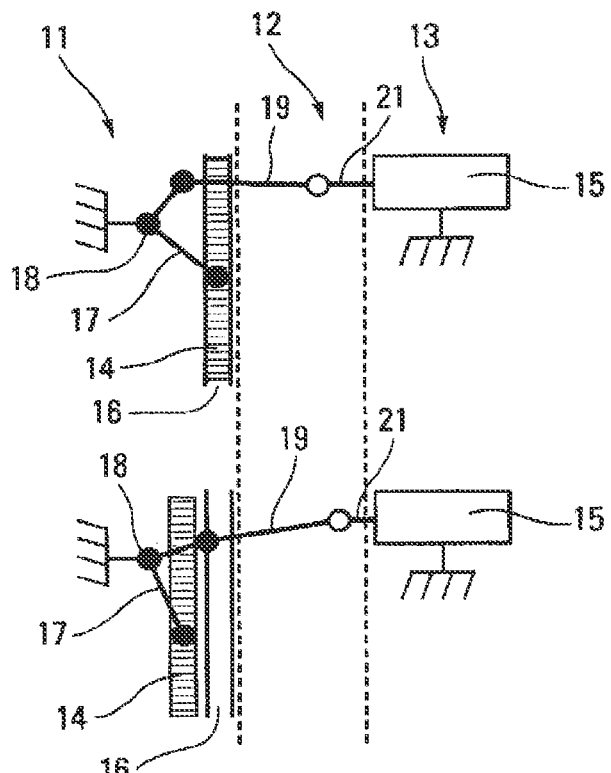
FIG. 3 is a schematic view of the elements constituting the discharge system in FIG. 2 according to the prior art, in the open position and in the closed position.
Figure 4:
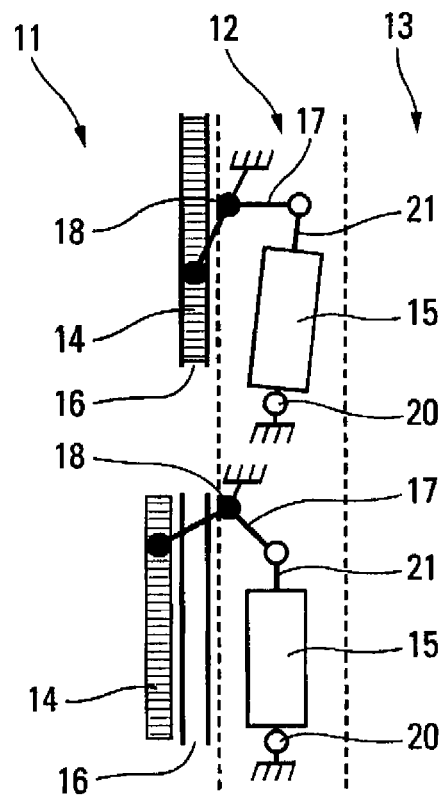
FIG. 4 is a schematic view of the same elements constituting the discharge system in FIG. 2 according to one embodiment of the invention.

FIGS. 3 and 4 now show diagrammatically, in a view from above, a bleed valve control system based on a circular slot and a guillotine ring which is described according to the prior art in FIG. 3 and according to the invention in FIG. 4, respectively in the closed position in the top diagram and in the open position in the bottom diagram.

The bleed valve uses a guillotine system, i.e. the discharged air is output through a circular duct 16 formed by two radial flanges extending from the primary duct 4. This duct can be closed or opened by a ring 14, called a guillotine ring, which can move axially and cover the duct 16 (when closed, as shown on the top figure) or open it (lower figure) to allow the air to escape from the primary duct 4 when the output from the LP compressor 2 is to be discharged. The movement of the ring 14 is ensured by an angled arm 17, a first end of which is attached to the ring 14 while the second end is attached directly or indirectly to the rod of the control cylinder 15. This angled arm is mounted at its elbow on a pivot 18 which extends radially from one of the walls of the inter-duct case 10. The rotation of the arm 17 around the pivot 18 is arranged such that an extension or a retraction of the cylinder corresponds to a rotation of this arm around its elbow in one direction or the other, and finally to an axial movement of the ring 14 towards the opening or closure of the duct 16.

More specifically, in FIG. 3 which represents the prior art, the pivot 18 is positioned in the first chamber 11 and the control cylinder 15 is positioned in the third chamber 13. A complementary connecting rod 19 then links the second end of the angled arm 17 to the rod 21 of the cylinder 15. However, in FIG. 4, which shows the configuration of the invention, the pivot 18 and the cylinder 15 are both positioned in the second chamber. The rod 21 of the cylinder 15 is coupled directly to the second end of the angled arm 17, with no complementary connecting rod, and the cylinder has a degree of rotational freedom in a plane tangential to the inter-duct case thanks to its connection to the arm of the intermediate case 6 via a pivoting connection point 20, to allow actuation of the angled arm.

Figure 5:
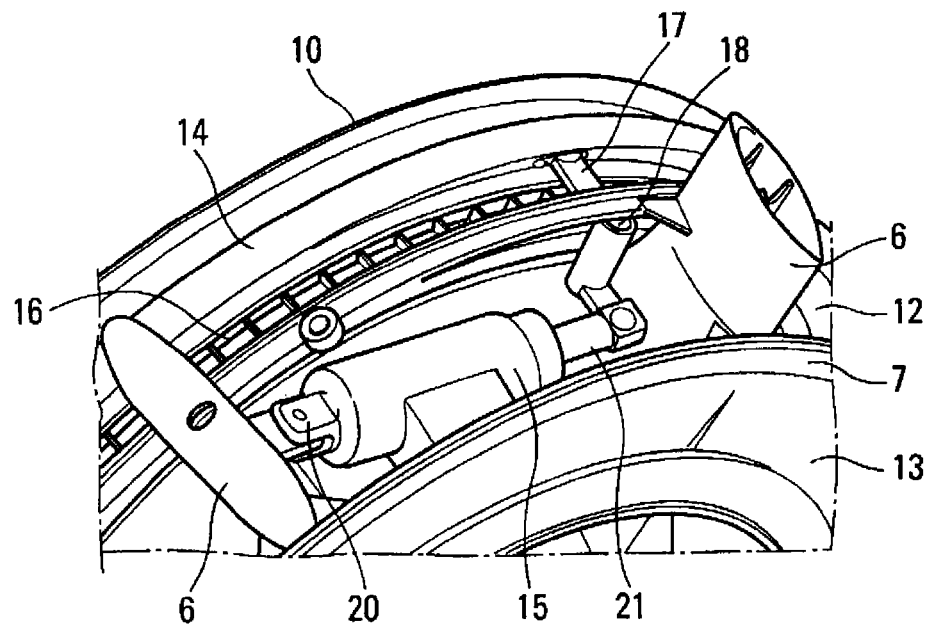
FIG. 5 is a perspective view of a discharge system according to one embodiment of the invention.

FIG. 5 shows the installation of the bleed valve control device in the second chamber, according to the invention. The external wall of the inter-duct case, which encloses chambers 11 to 13, has been removed to allow a view of their interior. The second chamber 12 consists of a circumferential succession of elementary chambers which are separated from each other by the arms 6 of the intermediate case 7. The control device is here represented by a cylinder 15 and an arm 17, both positioned in one of the second elementary chambers; it is evident that generally, several devices of this type are regularly distributed over the circumference of the intermediate case 7.

The ring 14 extends over the circumference of the inter-duct case 10 level with the first chamber 11, and is shown in a position in which it partially opens the duct 16 for evacuation of discharged air. This ring 14 is controlled by rotation of the angled arm 17 about its pivot 18, which induces an axial movement of the ring 14 associated with a rotation along the circumference of the inter-duct case. The pivot 18 is a shaft which extends from the inner wall of the inter-duct case within the second cavity, and over which, in the manner of a sleeve, the angled arm 17 is placed which remains freely rotatable. The control cylinder 15 for the ring 14 is positioned in a radial plane in a direction tangential to the circumference of the intermediate case. It extends between two arms 6 of said intermediate case, while remaining fully accommodated in the second chamber 12. At the end opposite the rod 21, the body of said cylinder has a cap 20 intended to be fixed pivoting around an axis extending radially from the inner wall of the inter-duct case 10. The cylinder is thus free to move in rotation in a plane tangential to the inter-duct case to allow the end of its rod 21 to follow the axial movements of the second end of the angled arm 17. The end of the rod 21 thus has the form of a cap, in which rests a shaft carried by the corresponding end of the angled arm 17, to allow their relative rotation in a plane tangential to the inter-duct case.

Figure 6:
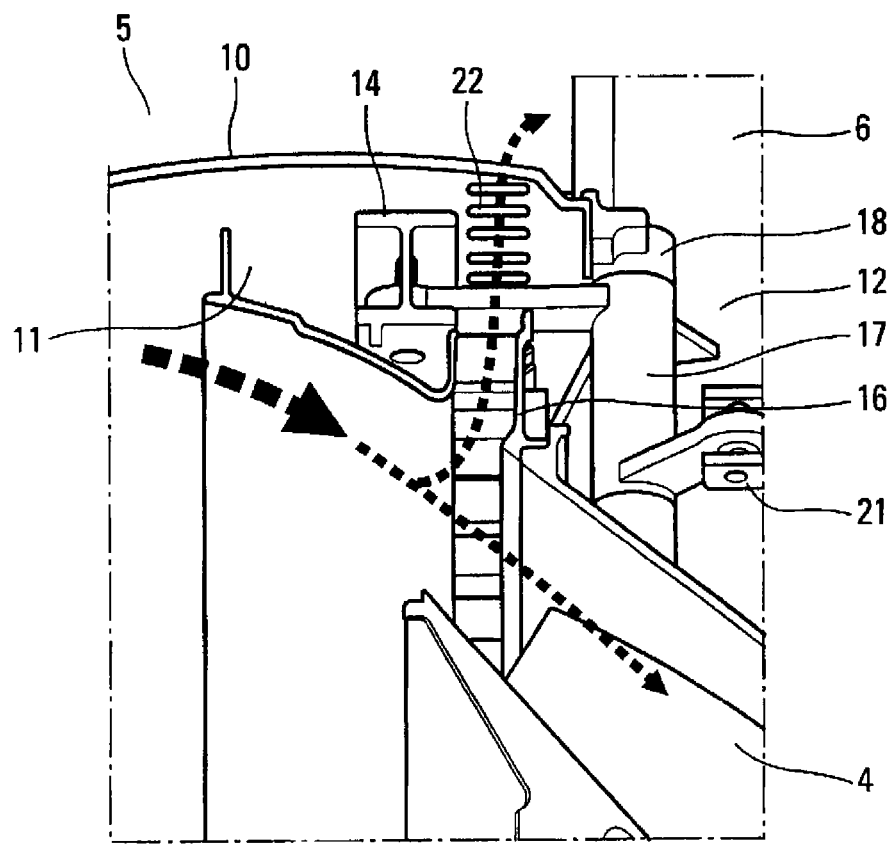
FIG. 6 is a cross section view of the discharge system of FIG. 5.

FIG. 6 shows the angled arm 17 which is mounted on the pivot 18, about which it can turn to cause axial movement of the ring 4. It has the form of a hollow cylinder from which two radial arms extend, each terminating in an eye through which passes a shaft allowing rotation in relation to the part to which it is connected, the ring 14 in one case and the rod 21 of the cylinder 15 in the other.

The ring 14 has an I-shaped cross section, the lower flange of which is intended, by movement towards the downstream side of the engine, to close a duct 16 extending from the lower wall of the inter-duct case 10. This duct starts in the wall of the primary duct 4 and opens into the inner cavity of the inter-duct case 10, more precisely here in the first chamber 11. The blown-off air from the LP compressor thus passes into the first chamber 11, which it leaves through the evacuation grille 22 to mix with the bypass flow.

The benefit of the solution recommended by the invention, in the embodiment which has just been described, will now be described.

The solution proposed to remedy the problems of space in the inner cavity of the primary cavity consists firstly of relocating the position of the pivot 18 downstream, to position it in the second chamber 12, and secondly of also positioning the control cylinder in this second chamber, freeing the space in the third chamber 13.

For this, the control cylinders are positioned tangentially in the second chamber and the complementary connecting rod 19 has been omitted. A further degree of freedom in rotation has been added to the cylinder 15, to avoid blocking the system. This cylinder is therefore no longer fixed but linked pivotingly on a radial shaft carried by the intermediate case 7.

For this solution to be viable, optimization work has been carried out on the diameter of the cylinders so they can be accommodated in the available space. This reduction in volume of the cylinder 15 has been made possible by its relocation from the third chamber 13 to the second chamber 12. In a turboduct engine, the third chamber in fact lies in the fire zone, i.e. in a zone in which the equipment is subject to severe standards in order to guarantee its fire resistance. Because this constraint no longer applies, it is no longer necessary to provide a cylinder cooling system, so the diameter can then be considerably reduced. The space required for the rod of the cylinder 15 can also be reduced by replacing its position sensors, which are generally internal, with rotational position sensors mounted on the arms which it actuates.

In conclusion, the proposed solution simplifies the mechanism of the system, limits its aerodynamic impact on the shape of the inter-duct case 10, reduces the mass and the space required for the components of the cylinder 15, and finally excludes the majority of the components from the chamber situated downstream of the intermediate case and hence from the fire zone.

This therefore represents a great advantage in terms of installation, in particular on small engines where the first chamber 11 of the inter-duct case 10 is particularly narrow, but where the inter-arm space is nonetheless sufficient for installation of this solution.

The invention claimed is:

1. An assembly comprising:
   an intermediate case of a bypass turboduct engine; and
   an inter-duct case including an edge provided upstream of the intermediate case to separate a primary air duct of the turboduct engine from a bypass air duct, the inter-duct case including, passing therethrough, a closable duct for diverting part of a primary flow to a bypass flow, thereby forming a bleed valve for a low pressure compressor,
   wherein the intermediate case comprises arms passing through the bypass duct,
   wherein the inter-duct case comprises in an inner cavity thereof a first chamber situated upstream of the arms and, a second chamber situated at a same axial location as the arms,
   wherein the closable duct is opened or closed by an annular component capable of axial movement set in motion by an angled arm that can rotate about a fixed pivot under action of a control cylinder entirely positioned in the second chamber, and
   wherein the annular component is located in the first chamber and the control cylinder includes a rod connected to the angled arm, and wherein a longitudinal axis of the control cylinder extends in a substantially tangential direction relative to an engine axis.

2. The assembly as claimed in claim 1, wherein the rod is movable in substantially the circumferential direction relative to the engine axis so as to move the angled arm in rotation about the fixed pivot.

3. The assembly as claimed in claim 1, wherein the control cylinder is mounted in a manner freely rotatable about an axis oriented radially.

4. The assembly as claimed in claim 1, wherein the rod of the control cylinder is directly connected to the angled arm.

5. The assembly as claimed in claim 1, wherein the fixed pivot is located in the second chamber.

6. A bypass turboduct engine comprising:
   an assembly comprising an intermediate case and an inter-duct case as claimed in claim 1; and
   the bleed valve for the low pressure compressor functions by diversion of part of the primary flow circulating in the primary air duct to the bypass air duct, via the closable duct that can be closed via the annular component capable of axial movement.

7. The assembly as claimed in claim 1, wherein the second chamber includes a circumferential succession of elementary chambers which are separated from each other by the arms.

8. The assembly as claimed in claim 2, wherein the control cylinder includes an end opposite the rod, said opposite end is connected to a second pivot around a radial axis extending radially from the inner wall of the inter-duct case such that the control cylinder moves freely in rotation in a plane tangential to the inter-duct case and the end of the rod follows the axial movements of the second end of the angled arm.

9. The assembly as claimed in claim 3, wherein the control cylinder includes an end opposite the rod, said opposite end is connected to a second pivot around a radial axis extending radially from the inner wall of the inter-duct case such that the control cylinder moves freely in rotation in a plane tangential to the inter-duct case and the end of the rod follows the axial movements of the second end of the angled arm.

* * * * *